United States Patent [19]

Jacobson et al.

[11] 4,033,898
[45] July 5, 1977

[54] IN SITU HYDROCARBON CONVERSION CATALYST REGENERATION WITHOUT SULFUR CONTAMINATION OF VESSELS COMMUNICATING WITH CATALYST REACTOR

[75] Inventors: Robert L. Jacobson, Pinole; Robert M. Ormiston, San Anselmo, both of Calif.

[73] Assignee: Chevron Research Company, San Francisco, Calif.

[22] Filed: Dec. 22, 1975

[21] Appl. No.: 643,581

[52] U.S. Cl. .............................. 252/416; 208/140; 252/411 S; 252/419

[51] Int. Cl.² .................. B01J 21/20; B01J 23/96; C10G 35/08

[58] Field of Search ............... 252/416, 419, 411 S; 208/140

[56] References Cited

UNITED STATES PATENTS

| 3,349,022 | 10/1967 | Mitchell et al. | 208/11 |
| 3,692,693 | 9/1972 | Gunning et al. | 252/419 |
| 3,785,996 | 1/1974 | Hayes | 208/140 |

FOREIGN PATENTS OR APPLICATIONS

| 744,429 | 2/1956 | United Kingdom | 252/416 |

*Primary Examiner*—Winston A. Douglas
*Assistant Examiner*—P. E. Konopka
*Attorney, Agent, or Firm*—D. A. Newell; R. H. Davies; W. D. Reese

[57] ABSTRACT

An improved process for removing sulfur from a bed of deactivated and sulfur-contaminated platinum-alumina catalyst in a reactor in a hydrocarbon conversion system having a vessel associated with the reactor, including the steps of: treating the catalyst with an oxygen-containing gas to burn off deactivating substances and oxidize sulfur in the catalyst bed; passing a hydrogen-containing gas through the catalyst bed to remove sulfur from the bed and form gaseous sulfur compounds; and removing the resulting sulfur-containing gas from the reactor and the conversion system by a path that excludes the sulfur-containing gas from contact with the associated vessel.

6 Claims, 1 Drawing Figure

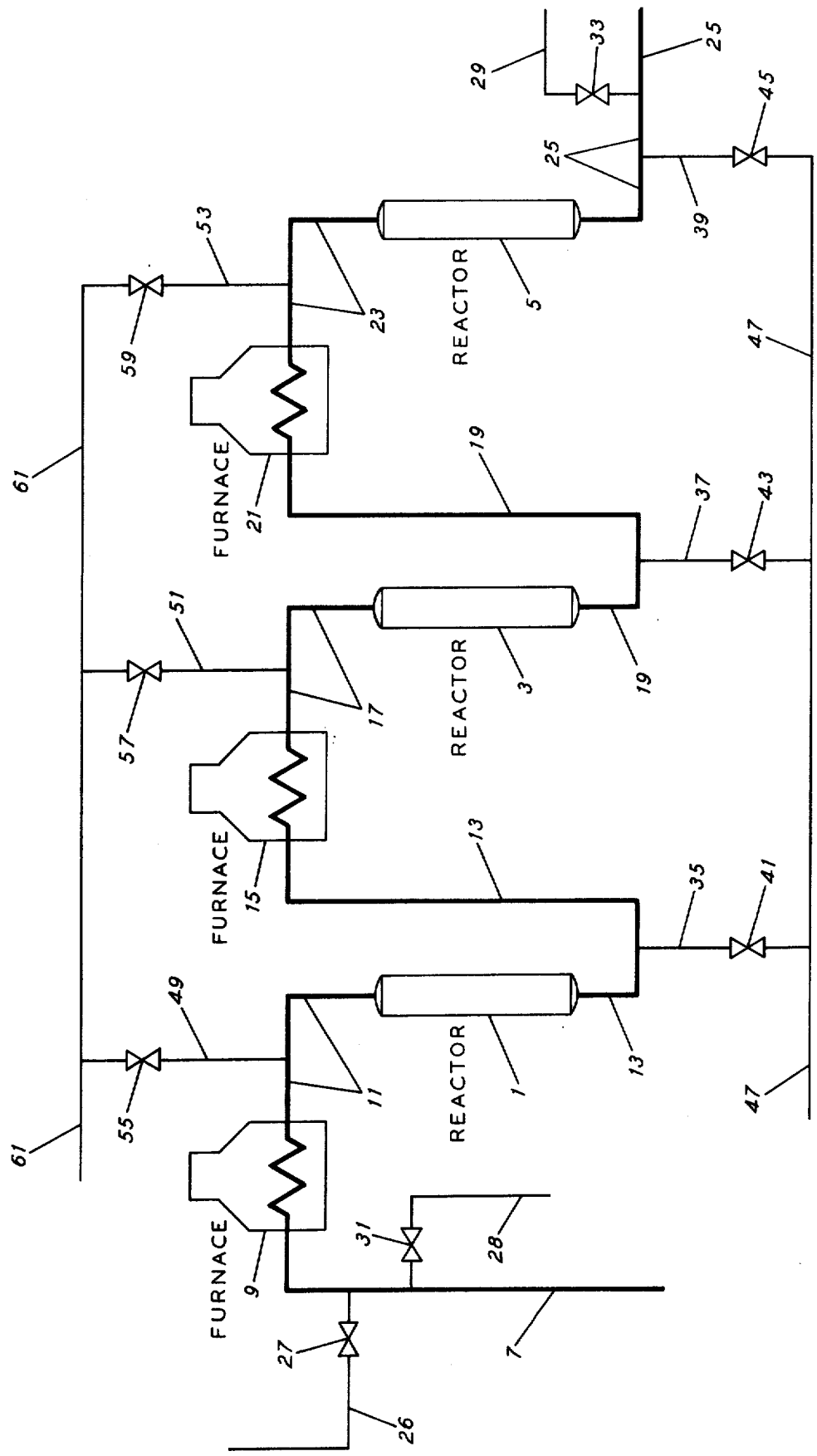

IN SITU HYDROCARBON CONVERSION CATALYST REGENERATION WITHOUT SULFUR CONTAMINATION OF VESSELS COMMUNICATING WITH CATALYST REACTOR

BACKGROUND OF THE INVENTION

This invention relates to a process for removing sulfur from a hydrocarbon conversion catalyst which has become contaminated with sulfur during use in a hydrocarbon conversion system, particularly to the in situ in removal of sulfur from a catalyst containing platinum and alumina which has become deactivated and sulfur contaminated.

Catalysts used in such hydrocarbon conversion processes as reforming, cracking, isomerization, alkylation, etc., normally become deactivated after a period of catalytic use. It is known to regenerate such catalysts by treating them with an oxygen-containing gas to burn off deactivating substances such as coke. Regeneration of hydrocarbon conversion catalysts with oxygen has often been performed in situ, i.e., by leaving a bed of catalyst in the reactor in which it had been used for catalytic conversion and passing an oxygen-containing regeneration gas into the reactor and through the catalyst bed to burn the deactivating substances off the catalyst.

Many hydrocarbon conversion systems, particularly naphtha hydroreforming units, employ a process scheme which passes the feed in series flow through two or more separate reactors. Each of the reactors contains at least one bed of a catalyst, and each reactor is connected to one or more other vessels by large-sized conduits through which the feed is passed. When the hydrocarbon conversion reaction, or reactions, being carried out in a particular system are endothermic, as in reforming, a heater, such as a heat exchanger or furnace, is normally connected into each of the large feed conduits upstream of each reactor to preheat the feed.

During in situ regeneration of a catalyst in plural-reactor-vessel conversion units, an oxygen-containing gas is conventionally passed in series flow through all the reactor vessels. The large feed conduits running between the reactors are used to pass the oxygen-containing gas from one reactor vessel to the next.

Hydrocarbons used as charge stocks for hydrocarbon conversion systems often contain sulfur compounds. During the operation of a conversion unit, sulfur in the feed reacts with iron in the linings of reactor, furnaces and other vessels, forming iron-sulfide scale. To some extent, sulfur may also be deposited directly in catalyst beds during hydrocarbon processing. In catalytic reforming units, sulfur contamination is usually a problem primarily in the furnaces and heat exchangers employed to heat the feed before it is charged to the reactors.

When a catalyst is regenerated in situ in a unit which has been contaminated with sulfur, oxygen in the regenerating gas reacts with sulfide scale to form sulfur dioxide. Some hydrocarbon conversion catalysts, e.g., those containing platinum and alumina, catalyze the reaction of sulfur dioxide and oxygen in the regeneration gas to form sulfur trioxide. Sulfur trioxide may then react with alumina in the catalyst to form sulfate, partially displacing catalytic metals such as platinum and rhenium. This impedes redistribution of catalytic metals on the alumina. Since good redistribution of catalytic metals is an important part of proper catalyst regeneration, the presence of sulfate in the catalyst during oxidative, high-temperature regeneration is undesirable.

Chemical cleaning of the whole conversion system effectively removes sulfur from all the vessels, and thus prevents substantial sulfate contamination of catalyst beds, but is costly and time-consuming. The present invention provides an economical and easily performed process for removing contaminant sulfate from a catalyst bed when the reactor containing the bed is connected to other vessels such as furnaces and reactors by large feed conduits. The present process prevents sulfur contamination of other reactors, catalyst beds, and heaters such as furnaces in a conversion system.

It has previously been suggested to isolate various heavily sulfur-contaminated elements of a hydrocarbon conversion unit, such as heaters, before contacting a deactivated catalyst with an oxygen-containing regeneration gas and to purge iron sulfide from the isolated heaters with high-temperature steam and/or an oxygen-containing gas. The freed particles of sulfide scale and/or sulfur dioxide-containing gas are then removed from the system. This type of vessel cleaning requires that several expensive valves or similar apparatus be installed directly into large feed conduits. Such apparatus is expensive and is unnecessary for normal operation of the conversion system and is used solely in the relatively infrequent regeneration of a catalyst. This procedure also requires unusually high-temperature conditions. The above-mentioned and other procedures for eliminating sulfide scale from heaters and other sulfur-contaminatable vessels in hydrocarbon conversion units are deficient in failing to provide an effective method for removing sulfur, as the sulfate, from a catalyst bed during in situ catalyst regeneration, hindering proper redistribution of catalytic metals on an alumina catalyst base.

SUMMARY OF THE INVENTION

In an embodiment the present invention relates to a process for regenerating a catalyst contaminated with carbonaceous deposits in situ in a catalytic hydrocarbon conversion unit including a reactor vessel containing a bed of catalyst comprising a Group VIII metal on an alumina carrier and including a sulfur-contaminatable vessel communicating with said reactor by a conduit, which comprises the steps of: (a) burning substantially all of the carbonaceous deposits on the catalyst and forming sulfur dioxide in the unit by passing an oxygen-containing gas stream through the reactor in contact with the bed of catalyst and through the sulfur-contaminatable vessel, at a temperature of about 500° F. to about 1,000° F., and removing the resulting gas from the unit; (b) forming a sulfur-containing gas in the reactor by contacting a hydrogen-containing gas with the bed of catalyst at a temperature of about 500° F. to about 1,000° F., passing the resulting sulfur-containing gas from the reactor into the conduit, and withdrawing the sulfur-containing gas from the unit through an opening in the conduit, and (c) continuously passing a stream of an inert gas through the sulfur-contaminatable vessel into the conduit and through the conduit at a rate sufficient to prevent substantially all the sulfur-containing gas from entering the sulfur-contaminatable vessel while carrying out step (b), and withdrawing the inert gas stream from the conduit in admixture with the sulfur-containing gas.

By the process of the invention, sulfur is removed from a catalyst bed in a hydrocarbon conversion system by a hydrogen-containing gas which removes the sulfur from the catalyst as a sulfur-containing gas. Sulfur contamination of sulfur-contaminatable vessels associated with the reactor, e.g., conduits, heaters such as furnaces, other reactors, etc., is avoided by removing the sulfur-containing gas from the treated bed and from the conversion system closely adjacent to the reactor, preventing sulfur-containing gas from contacting sulfur-contaminatable vessels. A particularly advantageous method for preventing contact between the sulfur-containing gas and sulfur-contaminatable vessels includes passing an inert gas stream through the conduit from an associated vessel toward the treated reactor containing the treated catalyst, and withdrawing the inert gas from the conduit, mixed with sulfur-containing gas, at and intermediate point.

DESCRIPTION OF THE DRAWING

The attached drawing is a schematic representation of a hydrocarbon conversion system in the form of a catalytic reforming unit having three reactors connected in a series feed-flow arrangement. Referring to the drawing, there is shown a reforming unit having a first reactor 1, a second reactor 3, and a third reactor 5. Each of the reactors 1, 3 and 5 contains a bed of a hydrocarbon conversion catalyst comprising platinum and alumina. During normal hydrocarbon conversion operation in the unit, a mixture of naphtha-boiling-range hydrocarbons and hydrogen is passed through a conduit 7 into a furnace 9 and then through a conduit 11 into the reactor 1 where it is contacted with the catalyst. During normal operation of the system, feed is then withdrawn from the reactor 1 through a conduit 13, passed through a furnace 15, and then through a conduit 17 into the reactor 3. The feed is then withdrawn from the reactor 3 via conduit 19, passed through a furnace 21, and then through a conduit 23 into the reactor 5. The final reaction products are withdrawn from the reactor 5 and passed to conventional separation and hydrogen recycle equipment (not shown) through a conduit 25. Recycled hydrogen is introduced into the conduit 7 from a conduit 26, equipped with a valve 27, which is open during normal operations. According to the invention, the feed and product conduits 7 and 25 are provided with means for introducing an inert gas stream into them, such as a conduit 28 leading into the conduit 7 and a conduit 29 leading into the conduit 25. The conduits 28 and 29 are respectively provided with a valve 31 and a valve 33, which close off the conduits 28 and 29 during normal reforming operation of the unit. The feed conduits 13, 19 and 25 are provided with means for removing sulfur-containing gas streams therefrom, such as conduit 35 leading from the conduit 13, a conduit 37 leading from the conduit 19, and a conduit 39 leading from the conduit 25. The conduits 35, 37 and 39 are respectively provided with valves 41, 43 and 45, which close off the conduits 35, 37 and 39 during normal reforming operations. The three conduits 35, 37 and 39 all lead into a disposal conduit 47, which is connected to a suitable means of conventional type (not shown) for disposing of refinery gas streams containing gaseous sulfur compounds. The conduits 11, 17 and 23 are provided with means for introducing a hydrogen-containing gas into them, such as a conduit 49 leading into the conduit 11, a conduit 51 leading into the conduit 17, and a conduit 53 leading into the conduit 23. The conduits 49, 51 and 53 are respectively provided with valves 55, 57 and 59, which close off the conduits 49, 51 and 53 during normal reforming operations. A conduit 61 is employed to pass a hydrogen-containing gas into one or more of the conduits 49, 51 or 53 during practice of a preferred embodiment of the present invention, as further described below. The conduits shown in the drawing and described above, aside from the conduits 7, 11, 13, 17, 19, 23 and 25, may conveniently be of a size very substantially smaller than the last-mentioned conduits, which must be of substantial size in order to handle the hydrocarbon/hydrogen feed mixture processed in the reforming unit. Accordingly, the valves depicted are relatively small and inexpensive.

Only those elements of a catalytic reforming unit necessary for an understanding of an embodiment of the invention are depicted in the drawing and mentioned in the foregoing description. Other elements included in catalytic reforming units and not shown or described, e.g., compressors, pumps, heat exchangers, etc., and their placement and operation in a reforming system, will be readily understood by those skilled in the art.

DETAILED DESCRIPTION OF THE INVENTION

The present process may appropriately be applied to catalysts having an alumina component and a Group VIII metal component. Alumina either alone or mixed with one or more other refractory inorganic oxides, is often used as a carrier for catalytic metals or metal compounds, particularly the Group VIII metals. The Group VIII metals used include especially platinum, palladium, iridium, and compounds and mixtures thereof. Platinum, for example, is commonly used in hydrocarbon conversion catalysts, either alone or combined with other Group VIII metal such as palladium or iridium, or with such promotor metals as rhenium, tin, germanium, lead, etc.. Catalysts containing two or more Group VIII metals and/or other metals such as rhenium, tin, or the like, are suitable for sulfur removal treatment by the present process. Catalysts including a Group VIII metal and alumina are often used in such hydrocarbon conversion processes as reforming, paraffin isomerization, alkyl aromatic isomerization, hydrogenation, dehydrogenation, alkylation and cracking, and the present process may be used in hydrocarbon conversion systems for carrying out these or other like processes. Many catalysts which contain a Group VIII metal and alumina also include a halogen component, such a chlorine or fluorine, or both. The addition of a halogen component is particularly common in the case of catalysts used in reforming and isomerization. The present process may suitable be employed to remove sulfur from catalysts having such a halogen component, preferably a chloride component. The present invention is applicable to hydrocarbon conversion systems such as catalytic reforming systems, isomerization process systems, etc., in which the processing system includes at least one reactor containing one or more beds of one or more hydrocarbon conversion catalysts, wherein the catalyst bed to be treated is regenerated in situ in the reactor when the catalyst has become deactivated through use. A given reactor normally communicates with other vessels such as furnaces, heat exchangers, other reactor vessels, separators, etc., by way of conduits. Associated vessels are normally located both upstream and downstream of a particular reactor in a processing system. For example, in a catalytic reforming unit an associated furnace is normally located upstream of each reactor and communicates with the reactor by a large conduit through which heated feed is passed to the reactor. In systems with plural reactors in series, another furnace and reactor are associated with the given reactor at its downstream end by a conduit running between the first reactor and the furnace and between the furnace and the second reactor.

Catalyst beds in hydrocarbon conversion systems can be detrimentally affected by the presence of sulfur in the system. Sulfur is commonly carried into the processing system in the hydrocarbon feed, where it is present in minor amounts. Sulfur contamination of catalyst beds by sulfate formation is particularly a problem during in situ regeneration of a catalyst which has become deactivated by use in converting a hydrocarbon feedstock.

The present process is carried out in connection with the oxidative, in situ regeneration of hydrocarbon conversion catalysts. Thus, it is contemplated that normal shutdown and volatile-hydrocarbon purging procedures will have been undertaken prior to carrying out the process of the invention. Accordingly, the hydrocarbon conversion system in which the present process is to be used will be free of hydrocarbon vapors and liquids and will have been purged of volatile, flammable materials by conventional purging of the whole system with an inert gas. Normally, a particular conversion system is isolated from the other systems in a refinery during regeneration by inserting plates into flanges built into the conduits connecting the system to other refinery equipment. This is done before the system to be regenerated is purged of hydrocarbon vapors.

The first step in carrying out the present process is contacting the catalyst bed which is to be freed from sulfur with an oxygen-containing gas. The amount of oxygen in the gas may be between about 0.1 and about 2.0 volume percent and is preferably between about 0.3 and 0.8 volume percent. The remainder of the gas is made up of one or more gases which are inert in the particular conversion system, such as nitrogen, argon, steam or carbon dioxide. A mixture of nitrogen and sufficient air to supply the required amount of oxygen is a preferred oxygen-containing gas for use in the present process. The oxygen-containing gases is passed through the bed of hydrocarbon conversion catalyst in any convenient manner while being maintained at a temperature between about 500° F and 1000° F, preferably between about 650° F and 750° F. The gas is maintained at a pressure of about atmospheric to about 40 atmospheres. The length of time for which the catalyst is contacted with the gas is usually between about 1 hour and about 48 hours, depending primarily on the amount of time required to burn substantially all of the carbonaceous deposits off the catalyst, e.g., to reduce the carbon content of the catalyst to about 0.1 weight percent or less. The oxygen-containing gas is preferably contacted with the catalyst bed by a known procedure for circulating an oxygen-containing gas through a catalyst bed to burn deactivating materials off the catalyst. The contacting is preferably accomplished by continuously passing a stream of the oxygen-containing gas throughout the internals of the hydrocarbon conversion system, including the reactor containing the catalyst bed. Circulation of the gas is discontinued when burn-off of deactivating carbonaceous materials is substantially complete, as evidenced, for example, by the presence of only a small temperature difference between reactor inlets an outlets. During treatment of the catalyst with oxygen-containing gas, some carbon dioxide, carbon monoxide and water vapor are generated and are commingled with the inert gases and oxygen in the gas in the system. After treating the catalyst with the oxygen-containing gas, the resulting gas mixture is removed from the reactor and purged from the hydrocarbon conversion system, preferably by purging the reactor and the system in a conventional manner with an inert gas.

Treating the catalyst with an oxygen-containing gas as described above converts sulfur or sulfur compounds in the catalyst bed into sulfur trioxide which interacts with alumina in the catalyst, forming a sulfate, which remains in the catalyst bed. The sulfate materials interfere with further regeneration of the catalyst, particularly with a catalyst which contains a halogen component and a promoter metal such as rhenium, in addition to the Group VIII metal and alumina. Sulfur thus present in the catalyst bed is removed from the catalyst and the hydrocarbon conversion system by the subsequent hydrogen treatment step.

A hydrogen-containing gas is contacted with the catalyst bed after the oxygen-containing gas has been removed from the reactor and purged from the hydrocarbon conversion system. The hydrogen-containing gas is passed through the bed of the sulfur-containing catalyst at a temperature between about 500° F and 1000° F. The preferred temperature range is from about 650° F to 750° F. The concentration of hydrogen in the gas is usually from about 5 volume percent to about 60 volume percent, although the exact concentration of hydrogen in the gas is not critical. A preferred concentration of hydrogen in the gas is between about 10 volume percent and about 25 volume percent. In addition to hydrogen, the hydrogen-containing gas contains one or more gases which are inert in the system, such as nitrogen, argon, etc., or a mixture thereof, with nitrogen being preferred. The hydrogen-containing gas is contacted with the catalyst bed at a pressure of about atmospheric to about 40 atmospheres, preferably about 2 atmospheres to about 10 atmospheres. Preferably, the hydrogen-containing gas is passed continuously into the reactor containing the catalyst being treated, across the bed of catalyst, and out of the reactor. The gas is then removed directly from the hydrocarbon conversion system, as further described below. Preferably, the hydrogen-containing gas is passed continuously through the catalyst bed until the amount of hydrogen which has been contacted with the catalyst is equal to, or greater than, the stoichiometric amount of hydrogen necessary to react with all the sulfur in the catalyst bed. The length of time of hydrogen-containing-gas treatment may be determined by analyzing the gas leaving the reactor to measure its sulfur-content, and discontinuing the hydrogen-containing gas treatment when the sulfur content of the exiting gas has fallen to a desirably low level, such as below about 100 ppm.

During hydrogen-containing gas treatment of the catalyst, the hydrogen reacts with sulfur in the form of sulfate in the catalyst bed, forming gaseous sulfur compounds such as sulfur dioxide and hydrogen sulfide. These gaseous sulfur compounds are then carried off from the catalyst bed in a stream of gas resulting from hydrogen treatment. This sulfur-containing gas stream is withdrawn from the reactor holding the catalyst and is removed from the hydrocarbon conversion system by a path which prevents the sulfur-containing gas from contacting other vessels associated with the particular reactor. By excluding the sulfur-containing gas from contact with associated vessels in the hydrocarbon conversion system (e.g., other reactors, furnaces and heat exchangers), the sulfur-containing gas is prevented from contaminating these other vessels and is prevented from contaminating catalyst beds in adjacent reactors. The prevention of sulfur contamination of associated vessels by the present process is in contrast to previously used methods for treating hydrocarbon conversions catalyst during catalyst regeneration, wherein gases used to treat catalyst in a reactor are normally circulated thereafter throughout the whole hydrocarbon conversion system. Previous procedures thereby allow gas streams containing gaseous sulfur compounds formed in a particular reactor to contact associated processing vessels, as well as beds of catalyst contained in other reactors.

According to the invention, the sulfur-containing gas stream is removed from the hydrocarbon conversion system without passing the sulfur-containing stream through any of the other associated vessels in the system. Means are provided, according to the present process, for removing the sulfur-containing gas from the system, preferably closely adjacent to the reactor containing the bed of catalyst from which sulfur has been withdrawn. In any hydrocarbon processing system, the reactor containing the bed of hydrogen-treated catalyst invariably communicates with associated upstream processing vessels and downstream processing vessels by a plurality of conduits. The conduits are normally used for introducing hydrocarbon feed to the reactor, often from an upstream heater or heat exchanger. Such conduits are also used to convey effluent from the reactor after conversion, as for example, to a downstream product receiver, heat exchanger, furnace or reactor vessel. In many cases, a downstream associated vessel will include both a heater, such as a furnace, and also a reactor which receives the heated feed from the downstream furnace. In such cases, it is particularly advantageous to employ the present sulfur removal process because sulfur is prevented from contacting both the downstream associated reactor and the downstream associated furnace.

The sulfur-containing gas formed by reaction of sulfur in the catalyst bed with the hydrogen-containing gas is removed from the hydrocarbon conversion system as close as possible to the reactor containing the catalyst bed, as by passing it into an opening into a disposal conduit from either the reactor feed conduit or from the reactor product effluent conduit. The sulfur-containing gas may then be sent to the conventional gas disposal means provided in the particular refinery in which the hydrocarbon conversion unit is situated, or to any other desired use.

A particularly advantageous method for removing the sulfur-containing gas from the reactor and from the hydrocarbon conversion system by a path which excludes the gas from contact with associated processing vessels is by withdrawing the sulfur-containing gas from the reactor into a conduit communicating with an associated upstream or downstream vessel and simultaneously, continuously passing an inert gas stream through the same conduit in the opposite direction, i.e., toward the reactor. The inert gas stream is made up of one or more gases which are inert in the hydrocarbon conversion system. For example, such gases as nitrogen, argon or methane, or any mixture of such gases, are suitable. The sulfur-containing gas stream and the inert gas stream are withdrawn from the conduit in admixture, and the mixture is then passed to suitable means in the refinery for disposing of the gaseous sulfur compounds.

The inert gas stream is passed through the conduit toward the reactor at a rate sufficient to prevent substantially any of the gaseous sulfur compounds from passing farther through the conduit past the disposal opening toward the associated processing vessel. The inert gas stream can advantageously be passed into the conduit after first having been passed through the associated vessel. This procedure aids in preventing any gaseous sulfur compounds from entering the associated vessel from the reactor. The pressure at which the inert gas stream is maintained is simply that sufficient to maintain a continuous flow of the inert gas at the desired flow rate through the conduit in the direction of the reactor from which the sulfur-containing gas is being removed.

ILLUSTRATIVE EMBODIMENT OF THE INVENTION

Although the present invention is described hereinafter in terms of the preferred embodiment as carried out in a catalytic reforming unit, the application of the process to other hydrocarbon conversion systems will be apparent to those skilled in the art.

The process of this invention is particularly suitable for use in catalytic reforming systems in which the catalyst is regenerated in situ, especially in catalytic reforming systems which employ a catalyst including a platinum component, a halogen component, and preferably a rhenium component, composited with aluminum.

A preferred embodiment of the invention can best be described by referring to the catalytic reforming system shown in the attached drawing. The reforming reactors 1, 3 and 5 each contain a bed of a commercially available reforming catalyst containing a platinum component, a rhenium component and a chloride component composited with alumina.

Prior to starting the present process, the catalyst beds in the system have become deactivated by catalytic use in reforming a naphtha feedstock and the reforming system has become sulfur contaminated by extended contact with minor amounts of sulfur brought into the system in the naphtha feed. The system has been shut down and volatile materials have been purged from it in a conventional manner. In shutting down the unit, the feed inlet conduit 7 and the product outlet conduit 25 have been blocked off to separate the reforming system from other refinery equipment, and nitrogen-containing gas has been passed through the system at an elevated temperature and removed from the system in order to purge volatiles from the system.

After volatiles have been purged, an oxygen-containing gas is passed into the system by way of the conduit 26. The valves 31 and 55 are shut off, so that the path of oxygen-containing gas is through the conduit 7, the furnace 9 and the conduit 11 into the reactor 1. After passing through the catalyst bed in the reactor 1, the resulting gas is withdrawn into the conduit 13. The valves 41 and 57 are kept shut off during the oxygen-containing gas treatment of the catalyst so that the gas flows through the conduit 13, the furnace 15 and the conduit 17 into the reactor 3. After substantially all the carbonaceous deactivating material has been burned off the catalyst in the reactor 1, the gas passing into the reactor 3 begins to burn the deactivating materials off the catalyst in the reactor 3. The resulting gas is withdrawn into the conduit 19. The valves 43 and 59 are kept shut off during the oxygen-containing gas treatment so that the gas from the reactor 3 flows through the conduit 19, the furnace 21 and the conduit 23 into reactor 5. After substantially all of the deactivating materials have been burned off the catalyst bed in the reactor 3, the gas flowing into the reactor 5 begins to burn deactivating materials off the catalyst in the reactor 5. After passing through the catalyst bed in reactor 5, the gas is withdrawn into the conduit 25. The valves 45 and 29 are kept shut off during the oxygen-containing gas treatment, and the effluent gas in the conduit 25, containing any reaction products from oxygen treatment of the catalyst beds in the reactors 1, 3 and 5, such as carbon dioxide, $H_2O$, etc., is removed from the system to conventional disposal.

The oxygen-containing gas is made up of nitrogen mixed with sufficient air to provide an oxygen partial pressure in the gas of about 0.5 to 1.0 psi. The oxygen-containing gas total pressure is about 100–200 psig. The temperature of the gas in the reactors 1, 3 and 5 is maintained at about 750° F. The gas is passed into the system at a rate of about 25 standard cubic feet per hour per pound of catalyst. The burn-off of carbonaceous materials proceeds through each catalyst bed in turn, and the oxygen-containing gas treatment is continued until there is essentially no temperature difference between the gas stream entering any of the reactors and the gas stream leaving the reactor. The flow of oxygen-containing gas is then discontinued, and substantially all the remaining oxygen is purged from the system by passing a nitrogen gas stream through the system.

During the oxygen-containing gas treatment, sulfur in the catalyst bed in the reactor 1 has been converted to sulfur trioxide and has interacted with alumina in the catalyst bed to form sulfate, which may hinder redistribution of the platinum and rhenium catalyst components on the alumina. This sulfur is thereafter removed from the catalyst bed by the hydrogen-containing gas treatment. Sulfur present as sulfate in the catalyst beds in the reactors 3 and 5 may also be removed in a like manner.

when the oxygen-containing gas has been purged from the system, the valve 27 is shut off, and hydrogen treatment of the catalyst bed in the reactor 1 is begun. The valves 31 and 41 are opened, and a continuous flow of nitrogen into the system through the conduit 20 is started. This inert nitrogen stream flows through, in turn, the conduit 7, the furnace 9, the conduit 11, the reactor 1 and the conduit 13, and into the conduit 35, and is withdrawn from the system through the disposal conduit 47. Simultaneously, the valve 33 is opened and a continuous flow of nitrogen into the system through the conduit 29 is begun. This inert nitrogen stream flows through, in turn, the conduit 25, the reactor 5, the conduit 23, the furnace 21, the conduit 19, the reactor 3, the conduit 17, the furnace 15 and the conduit 13, and into the conduit 35, and is withdrawn from the system through the disposal conduit 47. When the flow of inert nitrogen gas through the system is established as described, the valve 55 is opened, and hydrogen-containing gas is passed into the system through the conduit 61 and the conduit 49. The hydrogen-containing gas flows through the conduit 11 into the reactor 1 where it contacts a bed of sulfur-containing catalyst. The gas entering the reactor 1 contains about 10 volume percent hydrogen, with the remainder of the gas made up substantially all of nitrogen. The hydrogen-containing gas is contacted with the catalyst bed in the first reactor at a temperature of about 750° F and a pressure of about 50 psig. The flow rate of the gas is about 2–10 SCF per hour per pound of catalyst in the reactor 1. The hydrogen in the gas entering reactor 1 reacts with sulfur compounds in the catalyst bed to form gaseous sulfur compounds such as hydrogen sulfide and sulfur dioxide. The resulting sulfur-containing gas is withdrawn from the catalyst bed and from the reactor 1, and flows through the conduit 13 and the conduit 35 into the disposal conduit 47, by which it is removed from the system. By maintaining the flow of inert nitrogen through the reforming system from both the conduit 28 upstream of the reactor 1 and from the conduit 29 downstream of the reactor 1, the sulfur-containing gas formed in the reactor 1 is prevented from contacting the vessels associated with the reactor 1 by conduits, such as the furnace 9 upstream of the reactor 1 and the furnaces 15 and 21 the reactors 3 and 5 downstream of the reactor 1. Sulfur contamination of the catalyst beds in the reactors 3 and 5 is accordingly prevented. the treatment of the catalyst bed in the reactor 1 with the hydrogen-containing gas is continued until sulfur compounds present on the catalyst no longer react with a significant quantity of hydrogen, as evidenced by the substantial absence of gaseous sulfur compounds in the effluent. The valve 55 is then shut off and flow of the inert nitrogen gas through the reactor 1 is continued until any residual traces of sulfur-containing gas are removed from the reactor 1 and passed out of the system through the conduit 47. The valve 41 is then closed. Thereafter, by opening the valves 57 and 43, in the case of the reactor 3, or the valves 59 and 45, in case of the reactor 5, while simultaneously maintaining nitrogen gas flow through the system from the conduits 28 and 29, the catalyst bed in the reactor 3 or the catalyst bed in the reactor 5, respectively, can be treated with the hydrogen-containing gas introduced through the conduit 61 in the same manner described above for treating the catalyst bed in the reactor 1.

A preferred embodiment of the invention having been described, other embodiments and adaptations of the present process will be apparent to those skilled in the art.

What is claimed in:

1. A process for regenerating a catalyst contaminated with carbonaceous deposits in situ in a catalytic hydrocarbon conversion unit including a reactor vessel containing a bed of catalyst comprising a Group VIII metal on an alumina carrier and including a sulfur-contaminatable vessel communicating with said reactor by a conduit, wherein said catalyst has previously become at least partially deactivated by contact with a sulfur-containing hydrocarbon, a process for removing sulfur from said unit comprising the steps of:

a. burning substantially all of the carbonaceous deposits on the catalyst and forming sulfur dioxide in said unit by passing an oxygen-containing gas stream through said reactor in contact with said bed of catalyst and through said sulfur-contaminatable vessel, at a temperature of about 500° F to about 1000° F, and removing the resulting gas from said unit;

b. forming a sulfur-containing gas in said reactor by contacting a hydrogen-containing gas with said bed of catalyst at a temperature of about 500° F to about 1000° F, passing the resulting sulfur-containing gas from said reactor into said conduit, and withdrawing said sulfur-containing gas from said unit through an opening in said conduit; and c. continuously passing a stream of an inert gas through said sulfur-contaminatable vessel into said conduit and through said conduit toward said reactor at a rate sufficient to prevent substantially all said sulfur-containing gas from entering said sulfur-contaminatable vessel while carrying out step (b), and withdrawing said inert gas stream from said conduit in admixture with said sulfur-containing gas.

2. A process according to claim 1 wherein said hydrocarbon conversion system is a catalytic naphtha reforming system.

3. A process according to claim 1 wherein said hydrogen-containing gas stream comprises nitrogen and about 10 volume percent to about 25 volume percent hydrogen.

4. A process according to claim 1 wherein said catalyst bed in contacted with said hydrogen-containing gas at a temperature of about 650° F to about 750° F.

5. A process according to claim 1 wherein said vessel comprises a furnace.

6. A process according to claim 5 wherein said vessel further includes a second reactor containing a second bed of said catalyst, said second reactor communicating with said furnace.

* * * * *